Figure 1:
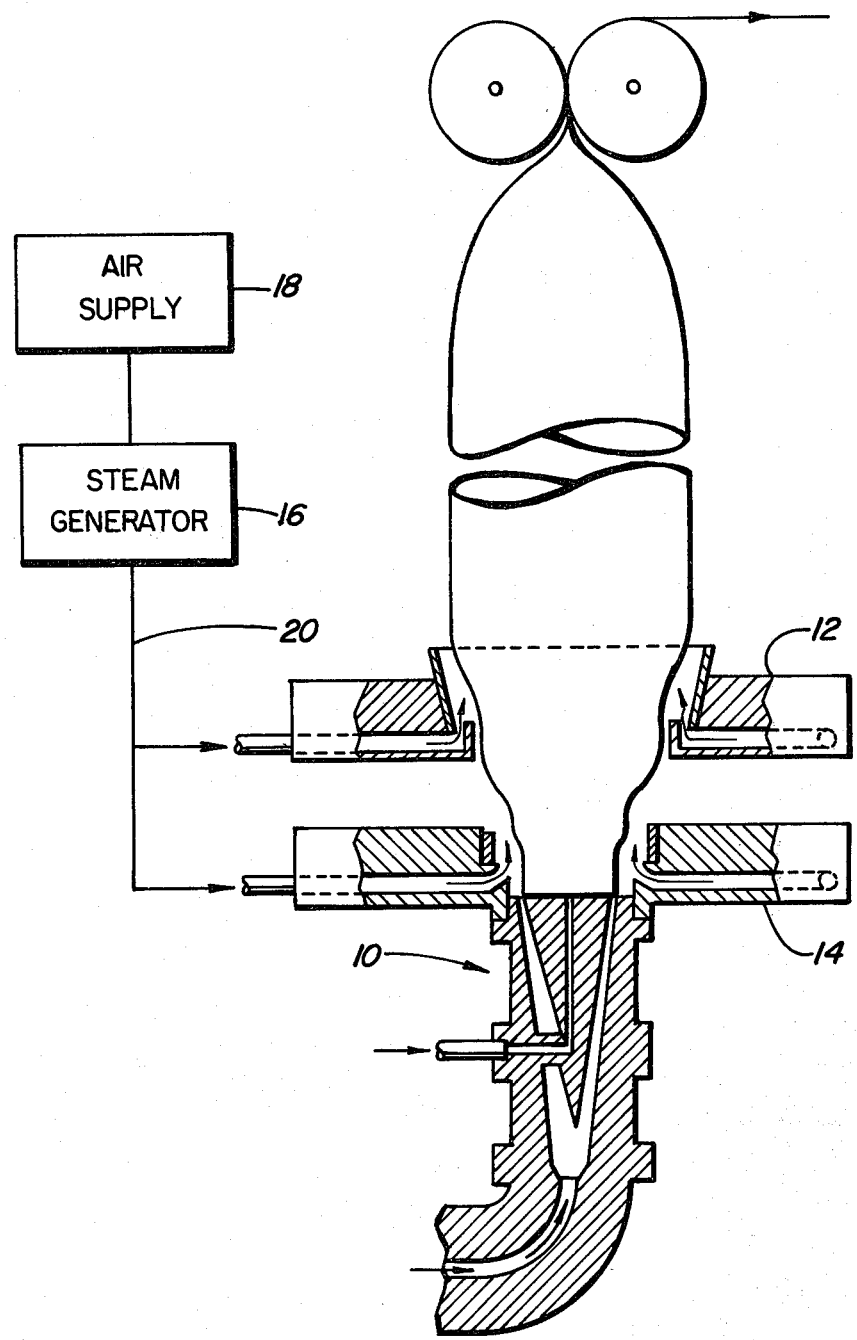

United States Patent [19]

Bose

[11] 4,434,129
[45] Feb. 28, 1984

[54] METHOD AND APPARATUS FOR COOLING MOLTEN TUBE

[75] Inventor: Ajit Bose, Rexdale, Canada

[73] Assignee: Leco Inc., Rexdale, Canada

[21] Appl. No.: 363,280

[22] Filed: Mar. 29, 1982

[51] Int. Cl.³ .............................................. B29F 3/08
[52] U.S. Cl. ...................................... 264/557; 264/564; 264/569; 425/72 R; 425/74; 425/326.1
[58] Field of Search .............. 264/557, 564, 566, 568, 264/569, 237; 425/74, 72 R, 526, 326.1

[56] References Cited

U.S. PATENT DOCUMENTS

| | | | |
|---|---|---|---|
| 2,461,975 | 2/1949 | Fuller | 264/569 |
| 2,461,976 | 2/1949 | Schenk | 264/569 |
| 3,061,876 | 11/1962 | Lloyd et al. | 264/569 |
| 3,127,458 | 3/1964 | Scott, Jr. et al. | 264/237 |
| 3,299,192 | 1/1967 | Lux | 264/237 |
| 3,321,563 | 5/1967 | Rettig et al. | 264/569 |
| 3,576,929 | 4/1971 | Turner et al. | 264/569 |
| 3,754,067 | 8/1973 | St. Eve et al. | 264/567 |
| 3,888,609 | 6/1975 | St. Eve et al. | 264/569 |
| 4,115,047 | 9/1978 | Stelmack | 264/557 |

FOREIGN PATENT DOCUMENTS

| | | | |
|---|---|---|---|
| 460963 | 11/1949 | Canada . | |
| 695759 | 10/1964 | Canada | 264/566 |
| 922063 | 3/1973 | Canada . | |
| 2455779 | 8/1976 | Fed. Rep. of Germany | 264/558 |

Primary Examiner—Jeffery R. Thurlow
Attorney, Agent, or Firm—McFadden, Fincham & Co.

[57] ABSTRACT

This invention provides an improvement in a method of cooling molten extruded tube produced by a blown-tube process. The improvement comprises cooling the tube utilizing the heat of evaporation of moisture in steam. The steam is brought into contact with the molten tube after extrusion of the molten tube from an extrusion die, whereby the steam is permitted to expand prior to, during or subsequent to contact with the molten tube. An apparatus is also provided for carrying out the above-described method.

13 Claims, 1 Drawing Figure

METHOD AND APPARATUS FOR COOLING MOLTEN TUBE

This invention relates to a method and apparatus for cooling a molten tube.

More particularly, this invention relates to a method of cooling a molten tube, and to an apparatus for carrying out such a method, in the process of extruding film-forming materials in what is commonly known as the blown-tube process.

The manufacture of film from plastic materials such as polyethylene is commonly carried out today by extruding film-forming resins in the "blown-tube" process. This process may be briefly summarized by saying that extrudable film-forming resin is introduced into an extruder where it is mixed and rendered molten, and the molten material subsequently passed through a die to form a bubble utilizing differential air pressure. The actual details of the blown tube method are well known to those skilled in the art and reference may be had to numerous publications and patents—for example, Canadian Pat. No. 460,963.

As is evident from the above discussion, the resin material, in the form of a bubble, as it emerges from the extrusion die has a diameter normally smaller than that desired in the final product. The expansion of the bubble requires a differential air pressure between the inside of the bubble and the atmospheric pressure into which it is extruded to provide a film of the desired thickness which is achieved by controlling the air pressure in conjunction with the amount of resin extruded, etc. The tube or bubble, in the direction of travel from the extrusion die, eventually solidifies from a molten mass to a solid—i.e., the lower portion of the tube or bubble is molten while the upper portion is solidified and the point at which the bubble actually solidifies is known as a "frost line".

For many reasons, the cooling of the bubble is a critical factor in the production of film such as from polyethylene resin. It is well known to those skilled in the art that the cooling rate can influence the quality of the product as to uniformity of film thickness, production capacity, etc. Normally, the molten tube, under today's technology, is subjected to one or more cooling zones using an annular flow of a gaseous cooling medium, such as air, which substantially surrounds the molten tube just downstream of the die. In most cases, the flow of the cooling gaseous medium is in a direction and in an amount sufficient to cause the bubble to be drawn outwardly towards the flow of the gaseous medium, so as to expand the diameter of the molten bubble and increase the size of the tube or film being produced.

The manner in which the cooling of the molten tube is carried out has also been changed over the years from the use of ordinary room-temperature air in the earlier times to the use of refrigerated air in large scale plants. The use of chilled or refrigerated air for cooling the molten bubble requires, of course, the expenditure of energy to produce the cooled air, which is normally produced by refrigeration systems or similar means. The amount of energy required for producing cooled air is quite significant having regard to the fact that relatively large volumes of cooled air are required for carrying out the cooling of the molten tube. In addition, the use of cooled air around an extruder, even with insulation of the apparatus, is not that efficient since the air itself is used in a "hot" enviroment—i.e., the surrounding ambient atmosphere and components of the extrusion apparatus are normally at signficantly elevated temperatures since the extrusion process relies on heat to produce the molten resin which is otherwise formed into a bubble.

With this invention, applicant has found that improved cooling can be obtained in a blown-tube process by utilizing, in direct contrast to the prior art, a source of steam, which may be saturated steam, for cooling the molten tube following extrusion from the extrusion die. More particularly, in accordance with the process of this invention, there is provided an improvement in a method of cooling molten extruded tube, produced by the blown-tube process, in which the improvement comprises cooling said tube utilizing the heat of evaporation of the moisture in the steam by bringing said steam into contact with said molten tube after extrusion of the molten tube from the extrusion die, whereby said steam is permitted to expand prior to, during or subsequent to contact with said molten tube.

In a still further aspect of this invention, there is provided an apparatus for cooling an extruded molten tube in which the apparatus comprises air ring means adapted to surround a molten extruded tube produced by a blown-tube process in which a molten tube is extruded from an extrusion die, steam generating means for generating a source of steam, means for operatively associating said steam generating means with said air ring means to feed a stream of steam into said air ring means, said air ring means comprising means for dispensing an annular flow of steam surrounding said molten extruded tube for permitting said steam to expand prior to, during, or subsequent to contact with said molten tube, whereby said steam is effective to cool said molten tube.

In greater detail, the process and apparatus for steam-cooling a molten tube utilizes the heat differential between the steam and the temperature of the melt (the molten tube) following extrusion. To this end, suitable steam-generating apparatus is employed in which a source of steam is generated; the steam generating apparatus may be any conventional steam generating apparatus which generates steam, which may be in a saturated steam condition. The choice of using saturated steam will be dependent on several factors which include, for example, the capacity of cooling required for a particular type of resin, the melt temperature, and the degree of cooling desired (i.e., whether cooling is desired as quickly as possible or more slowly), etc. Typical steam-generating apparatus may include appropriate valve means for controlling the amount of steam; likewise, there is normally associated with such steam-generating means, inlet means for providing a source of air, outlet means for delivering a supply of steam, the outlet means being operatively associated with the air ring means, and means for supplying a supply of moisture or water to the steam-generating means. The inlet means for the steam-generator, or the steam-generator per se, may be provided with suitable means for supplying a source of air, normally ambient air, under pressure so as to provide a desired air flow from the steam-generating means to the air ring means. Typically, such means will comprise compressor means or the like, supplying air and the resultant steam from the steam-generator to the air ring means. In preferred forms of the apparatus of the present invention, and for carrying out the process involved therewith, the steam-generating means will supply a source of steam under high velocity, typically measured as a static pressure measurement equalling 10 to 15 inches of water. The larger extrusion die set-ups which are employed in the art today will generally use higher velocities measuring from 14 to 15 inches of water and extending upwards to 24 or 25 inches of water, depending on the type of die. In single air rings, which are utilized on smaller extrusion dies for older equipment, the air velocity will measure as low as 4 to 5 inches of water.

The apparatus of the present ivention, insofar as it includes the air ring means surrounding an extrusion die, may typically be enclosed in a housing or enclosed chamber, in order to control the amount of steam or moisture containing atmosphere surrounding the extrusion process. Thus, for example, an enclosed housing, preferably of transparent material such as the material marketed under the trademark "PLEXIGLASS", may be employed to surround the air ring means and extend upwardly of the bubble a suitable distance (preferably above the frost line); the housing preferably forms a chamber which retains the moisture-laden atmosphere produced by the steam-generating means after the steam has been utilized for cooling purposes; means for removing the moisture-laden atmosphere may be employed for evacuating the chamber and for removing the moisture-laden atmosphere therefrom. To this end, a simple air evacuation pump may be connected to the chamber and if desired, the air evacuated from the chamber may be recycled to feed the same back into the steam-generating means to form a closed loop system. Preferably, the moisture-laden atmosphere which is spent is removed as soon as possible after utilization; means may be provided surrounding the lower portions of the enclosed housing and/or operatively associated with the air ring means and/or associated with the extrusion die, for removing condensed moisture from the chamber or any area in proximity to the extrusion die or air ring—for example, in the case of condensation of any of the moisture from the spent atmosphere, the housing may be provided with a collecting surface connected to a conduit which in turn is either discharged or recycled through the steam-generating means for subsequent use in the steam-generating means.

In carrying out the process of this invention and for use with the apparatus described above, any suitable air ring means may be employed ranging from single air ring means to two or more of such air ring means. For example, as disclosed in Canadian Pat. No. 922,063, two air rings may be employed to provide additional cooling capacity from the steam. The air ring means per se do not form any part of this invention except that in utilizing the air ring means, the air ring means comprises an annular ring (at least one) capable of dispersing or dispensing a supply of steam, preferably under high velocity conditions, into contact with the molten tube, whereby the steam is permitted to expand, prior to, during or subsequent to contact with the molten tube following extrusion of the molten tube from the extrusion die. In a preferred form, the air ring means is preferably constructed so as to direct a source of steam into contact with the molten tube following expansion of the steam after release from the air ring means, the point of contact with the molten tube being less than 90° and significantly greater than 10°, when measured in the axial direction of movement of the molten tube.

In the process of the present invention, as outlined above, the steam is permitted to expand after issuing from the lips of the air ring and following expansion of the steam, and due to expansion thereof, the moisture in the steam condenses from the steam and since the steam is in contact with the molten extruded tube, the moisture is caused to evaporate resulting in cooling of the molten tube. Thus, the moisture in the steam condenses in the form of droplets and it is these droplets of moisture, in contact with the molten tube, which evaporate and permit the cooling effect to occur on the molten tube. Thus, typically with a low density polyethylene, a melt temperature of 320° F.–380° F. is employed so that the molten tube is extruded from the die lips at or about these temperatures. Steam, utilizing a steam-generator, may be generated under gaseous flow conditions of, e.g., 1000 c.f.m. or less, and steam issuing from the air ring means at 212° F., brought into contact with the molten tube, provides a temperature differential, after expansion, of, e.g., 180° F. when the melt temperature is 400° F.—or in other words, the cooling capacity of the steam at that point under those conditions is approximately 180° F.

In general, it is preferred to utilize steam which is saturated to increase the cooling capacity for any given process conditions. It has been found that the heat transfer efficiency using saturated steam for a hot fluid versus a cold fluid is best and most efficiently employed under saturated steam conditions so that the latent heat of evaporation of the moisture is more effectively utilized when employing saturated steam. To those skilled in the art, depending on the particular resin chosen and which is being extruded, as to the melt temperature, steam, or saturated steam, will have varying capacities to cool the molten tube and the appropriate degree of saturation of the steam may be chosen for optimizing the cooling conditions under measurements well known by those skilled in this art—for example, reference may be had to "The Properties of Dry Saturated Steam", of the publication take from "The 1939 Callendar Steam Tables".

The advantage of employing the process of the present invention is that, e.g., when employing saturated steam at 212° F., and a typical melt temperature of 350°–400° F. for a low density polyethylene resin, a cooling capacity of 130° F.–180° F. is obtained; to obtain a similar cooling capacity utilizing refrigerated air, it will be seen that the refrigerated air must be lowered by a similar amount which requires the use of a significant energy expenditure compared to the process of the present invention.

An apparatus according to the invention as illustrated in FIG. 1, which is a side elevational view of a blown-tube arrangement shown partly in section and partly in schematic, illustrating the invention.

The apparatus has a die member indicated by reference numeral 10 for extruding a molten blown-tube, with a pair of spaced apart air rings 12 and 14 which surround a molten extruded tube. The steam generating means 16 are provided for generating steam; air supply means 18 which may be any suitable conventional means such as a compressor, etc. supply pressurized air to the steam generator, which in turn, is operatively associated with the air ring means 12 and 14 by means of conduit 18 to feed into the respective lines for the air rings. The blown tube, die and spaced air rings may be according to Canadian Pat. No. 922,063.

It will be understood that various modifications can be made to the above-described embodiments without departing from the spirit and scope of the invention as described herein.

I claim:

1. In a method of convection cooling a molten extruded tube produced by a blown-tube process, the improvement comprising cooling said tube by convection by utilizing the heat of evaporation of moisture in steam by bringing said steam into contact with the exterior surface of said molten tube after extrusion of the molten tube from an extrusion die, said steam being permitted to expand prior to, during or subsequent to contact with said molten tube, whereby the latent heat of evaporation cools said molten tube.

2. A method as defined in claim 1 wherein said steam is saturated steam.

3. A method as defined in claim 1 wherein said steam is applied to the molten tubing following extrusion of the molten tubing, said steam being applied in an annular flow substantially about the circumference of the tube.

4. A method as defined in claim 3 wherein said steam is applied immediately after the molten tube is extruded from an extruder die.

5. A method as defined in claim 1 wherein the steam is applied at more than one stage whereby at least primary and secondary cooling of the molten bubble is obtained.

6. A method as defined in claim 1 wherein said steam is applied under gaseous flow conditions of more than 1000 c.s.m.

7. A method as defined in claim 1 wherein the point of contact of the steam with the tube is greater than 10° and less than 90° relative to the axial direction of movement of the tube.

8. An apparatus for convection cooling an extruded molten tube comprising air ring means adapted to surround a molten extruded tube produced by a blown-tube process in which a molten tube is extruded from an extrusion die, steam generating means for generating a source of steam, means for operatively associating said steam generating means with said air ring means to feed a stream of steam into said air ring means, said air ring means comprising means for dispensing an annular flow of steam surrounding the exterior surface of said molten extruded tube and for permitting said steam to expand prior to, during, or subsequent to contact with said molten tube, whereby said steam is effective to cool said molten tube by convection cooling utilizing the heat of evaporation of said steam.

9. An apparatus as defined in claim 4 wherein said apparatus includes air supply means for supplying a source of pressurized air.

10. An apparatus as defined in claim 9 wherein the source of pressurized air is fed to said steam generating means.

11. An apparatus as defined in claim 8 wherein the steam generating means comprises means for generating saturated steam.

12. An apparatus as defined in claim 8 wherein there are included two or more air rings to provide at least primary and secondary cooling.

13. An apparatus as defined in claim 8 wherein said air ring means includes air ring lips for permitting said steam to expand upon issuing from said air ring means and wherein said lips are adapted to direct said steam into contact with said molten tube at an angle greater than 10° but less than 90° relative to the axial dierection of movement of said molten tube.

* * * * *